(12) United States Patent
Chen et al.

(10) Patent No.: US 8,861,644 B2
(45) Date of Patent: Oct. 14, 2014

(54) DEVICES OF IQ MISMATCH CALIBRATION, AND METHODS THEREOF

(75) Inventors: Hsin-Hung Chen, Zhubei (TW); Hsiang-Hui Chang, Miaoli (TW)

(73) Assignee: Mediatek Inc., Hsin-Chu (TW)

( * ) Notice: Subject to any disclaimer, the term of this patent is extended or adjusted under 35 U.S.C. 154(b) by 595 days.

(21) Appl. No.: 13/168,226

(22) Filed: Jun. 24, 2011

(65) Prior Publication Data

US 2012/0328041 A1  Dec. 27, 2012

(51) Int. Cl.
 H04L 27/20 (2006.01)
 H04L 27/36 (2006.01)

(52) U.S. Cl.
 CPC ............................. *H04L 27/364* (2013.01)
 USPC ............ 375/308; 375/267; 375/279; 375/221

(58) Field of Classification Search
 USPC .......................................... 375/308, 221, 279
 See application file for complete search history.

(56) References Cited

U.S. PATENT DOCUMENTS

| 7,567,611 B2 | 7/2009 | Chien |
| 7,672,364 B2 | 3/2010 | Kang et al. |
| 7,706,475 B1 * | 4/2010 | Kopikare et al. ............. 375/324 |
| 7,782,928 B2 | 8/2010 | Kang et al. |
| 7,856,048 B1 * | 12/2010 | Smaini et al. ................. 375/221 |
| 8,000,382 B2 * | 8/2011 | Inanoglu et al. ............. 375/221 |
| 2008/0037684 A1 | 2/2008 | Lin |

FOREIGN PATENT DOCUMENTS

WO  WO 2010/124298  10/2010

* cited by examiner

*Primary Examiner* — Qutbuddin Ghulamali

(74) *Attorney, Agent, or Firm* — McClure, Qualey & Rodack, LLP

(57) ABSTRACT

The device with IQ mismatch compensation includes a transmitter oscillator, a transmitter module, and a loop-back module. The transmitter module is arranged to up-convert a transmitter signal with the oscillator signal to generate an RF signal. The loop-back module is arranged to down-convert the RF signal with the oscillator signal to determine a transmitter IQ mismatch parameter, and effects of IQ mismatch of the loop-back module are calibrated by inputting a test signal and the oscillator signal before the down-converting of the RF signal. The transmitter module is arranged to reduce effects of IQ mismatch of a transmitter path in the transmitter module according to the transmitter IQ mismatch parameter.

32 Claims, 9 Drawing Sheets

DEVICES OF IQ MISMATCH CALIBRATION, AND METHODS THEREOF

BACKGROUND OF THE INVENTION

1. Field of the Invention

The disclosure relates generally to IQ mismatch calibration, and, more particularly to devices of IQ mismatch detection and compensation, and methods thereof.

2. Description of the Related Art

Wireless communication devices are commonly deployed in wireless communication systems to provide communication services such as voice, multimedia, data, broadcast, and messaging services. In a conventional wireless communication device such as a mobile phone, a digital baseband circuit block provides a data stream of complex, digital baseband data to a transmitter, where the transmitted baseband data are often carried on an orthogonal transmitter signal represented by real components and imaginary components, or, in-phase (I) and quadrature (Q) components. In the transmitter, the real component and the imaginary component of the transmitter signal are processed along a real-component circuit path and the imaginary component is processed along an imaginary-component circuit path, parallel to each other. The digital and analog signal processing along the real-component and the imaginary-component circuit path are all in parallel, and may include multiplexing, filtering, power control, and up-sampling processes, and so on. The parallel signal processed transmitter signal is modulated to produce an analog radio frequency (RF) signal to be amplified and radiated onto the air interface from an antenna, providing communication data exchange with a base station of the communication system.

Ideally, the real and imaginary components are processed along parallel circuit paths in the transmitter, and the circuit elements along one path are perfectly identical, or "matched", with corresponding circuit elements along the other parallel channel. However, the corresponding circuit elements along the real and imaginary circuit paths often have slight or relatively significant differences from each other due to manufacturing process variations and geometrical layout differences, resulting in non-negligible amplitude differences ("IQ gain mismatch") and phase differences ("IQ phase mismatch") between the real and imaginary components that are processed along the parallel paths. The non-negligible IQ gain and phase mismatch may result in unacceptable degraded signal quality.

Thus devices capable of IQ mismatch correction and methods thereof are needed to increase transmitted signal quality.

BRIEF SUMMARY OF THE INVENTION

An embodiment of a device with IQ mismatch compensation is disclosed, comprising a transmitter oscillator, a transmitter module, and a loop-back module. The transmitter oscillator provides an oscillator signal. The transmitter module is arranged to up-convert a transmitter signal with the oscillator signal to generate an RF signal. The loop-back module is arranged to down-convert the RF signal with the oscillator signal to determine a transmitter IQ mismatch parameter, wherein effects of IQ mismatch of the loop-back module are calibrated by inputting a test signal and the oscillator signal before the down-converting of the RF signal. The transmitter module is arranged to reduce effects of IQ mismatch of a transmitter path in the transmitter module according to the transmitter IQ mismatch parameter.

Another device with IQ mismatch compensation is provided, comprising a transmitter module and a loop-back module. The loop-back module is for down-converting an RF signal to determine a transmitter IQ mismatch parameter. The transmitter module is for up-converting a transmitter signal to generate the RF signal. Wherein the loop-back module is arranged to determine a first mismatch parameter of the transmitter IQ mismatch parameter when the transmitter module sets one of an in-phase component and a quadrature component of the transmitter signal to a zero signal, the loop-back module is arranged to determine a second mismatch parameter of the transmitter IQ mismatch parameter when the transmitter module sets the other one of the in-phase component and the quadrature component of the transmitter signal to a zero signal; and the transmitter module is arranged to reduce effects of IQ mismatch of a transmitter path in the transmitter module according to the transmitter IQ mismatch parameter.

Yet another IQ mismatch compensation method is disclosed, comprising up-converting a transmitter signal with an oscillator signal by a transmitter module to generate an RF signal; down-converting the RF signal with the oscillator signal to determine a transmitter IQ mismatch parameter by a loop-back module, wherein a test signal and the oscillator signal are inputted to calibrate effects of IQ mismatch of the loop-back module before the down-converting of the RF signal; and reducing effects of IQ mismatch of a transmitter path in the transmitter module according to the determined transmitter IQ mismatch parameter.

Still another IQ mismatch compensation method is shown, wherein a transmitter module is arranged to up-convert a transmitter signal to generate an RF signal, the IQ mismatch compensation method comprising down-converting the RF signal to determine a transmitter IQ mismatch parameter by setting one of an in-phase component and a quadrature component of the transmitter signal to a zero signal to determine a first mismatch parameter of a transmitter IQ mismatch parameter; and setting the other one of the in-phase component and the quadrature component of the transmitter signal to a zero signal to determine a second mismatch parameter of the transmitter IQ mismatch parameter; and reducing effects of IQ mismatch of a transmitter path in the transmitter module according to the determined transmitter IQ mismatch parameter.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
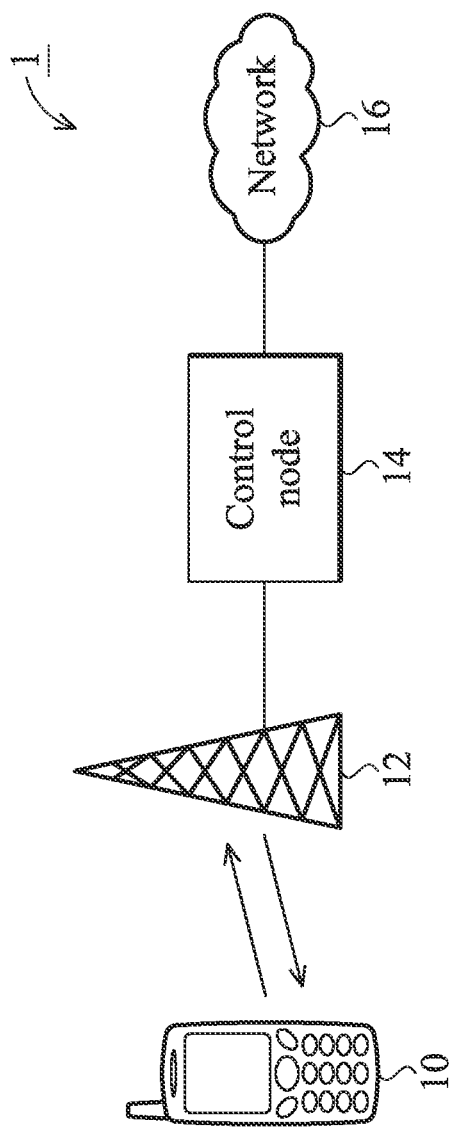
FIG. 1 is a block diagram of an exemplary wireless communication system.

FIG. 1 is a block diagram of an exemplary wireless communication system 1, comprising a communication device 10, a base station 12, a control node 14, and a service network 16. The communication device 10 is wirelessly coupled to the base station 12, which is further coupled to the control node 14 and the service network 16.

The wireless communications between the communication device 10 and the service network 16 may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

The wireless communication system 1 may use a frequency division duplexing (FDD) or time division duplexing (TDD) techniques. In the FDD system, the communication device 10 and the base station 12 communicates through uplink and downlink communication at different frequencies. In the TDD system, the communication device 10 and the base station 12 communicates through uplink and downlink communication at different time, typically deploys asymmetrical uplink and downlink data rates. The communication device 10 may be a hand-held cellular phone, a laptop computer equipped with a wireless adapter, or any other device. The communication device 10 comprises a transceiver module (not shown) for performing the functionality of wireless transmissions and receptions to and from the base station 12. The transceiver module may comprise a baseband unit (not shown) and an analog unit (not shown). The baseband module may comprise hardware to perform baseband signal processing including digital signal processing, coding and decoding, and so on. The analog module may comprise hardware to perform analog to digital conversion (ADC), digital to analog conversion (DAC), gain adjusting, modulation, demodulation, and so on. The base station 12 includes transceivers, antenna interface equipment, and power supplies. The service network 16 is a radio access network, such as a GSM network, a UMTS network, and so on. The service network 16 provides wireless communication services to the communication device 10. The uplink and downlink communication between the communication device 10 and the base station 12 employs orthogonal RF signals comprising in-phase (I) and quadrature (Q) components, thus IQ imbalance correction of the RF signals is in need to provide increased signal quality under harsh transmission environment.

Figure 2:
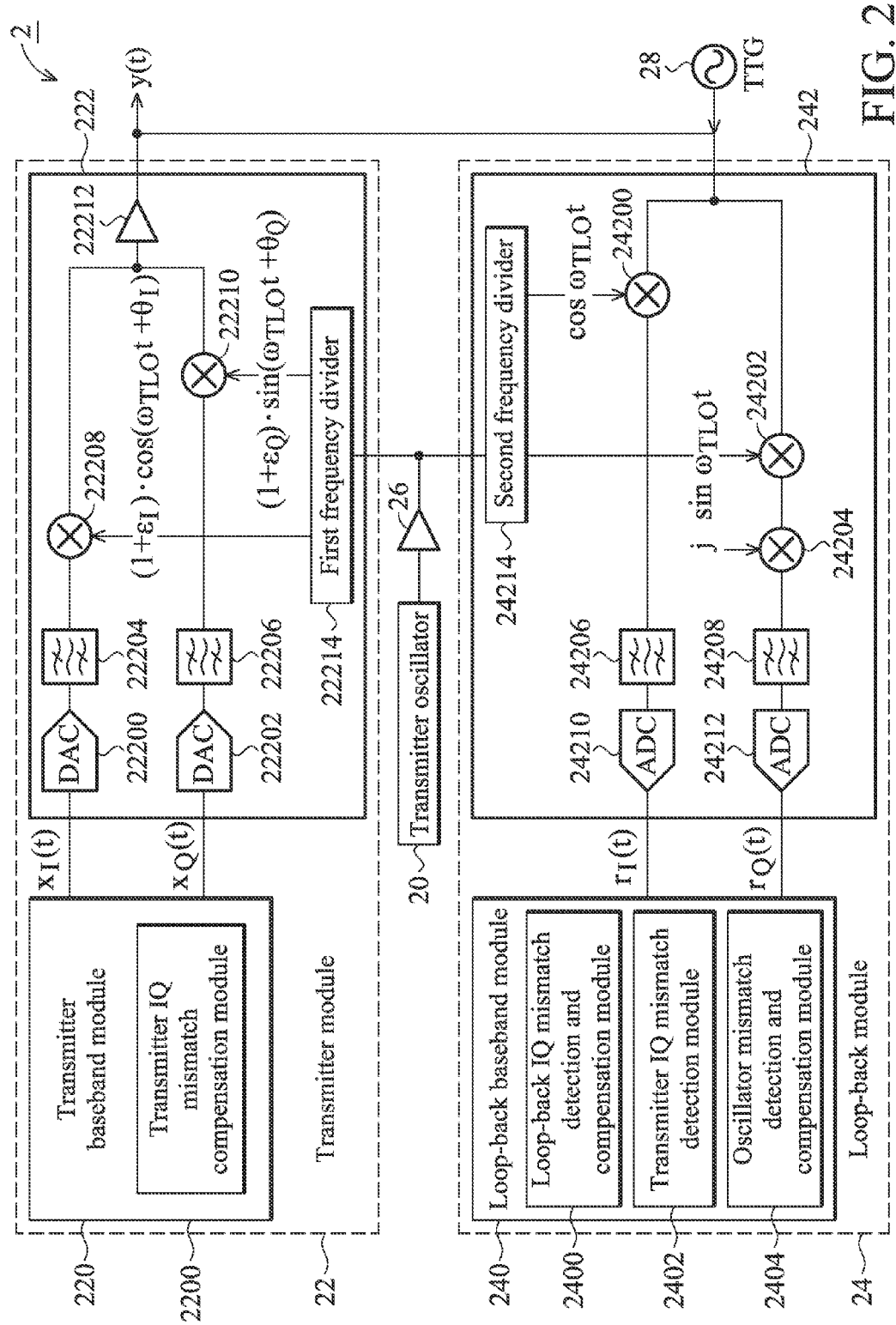
FIG. 2 is a block diagram of an exemplary transceiver circuit in accordance with the present invention.

FIG. 2 is a block diagram of an exemplary transmitter device in accordance with one embodiment of the present invention, incorporated in the communication device 10 in FIG. 1. The communication device utilized the transmitter device 2 is utilized in either a FDD or TDD system. The IQ mismatch comprises phase and gain (amplitude) mismatch. The transmitter device 2 is capable of IQ mismatch detection and compensation, and comprises a transmitter oscillator 20, a transmitter module 22, a loop-back module 24, an oscillator buffer 26, and a test tone generator 28. The transmitter oscillator 20 is coupled to the oscillator buffer 26, subsequently coupled to the transmitter module 22 and the loop-back module 24. The transmitter module 22 is coupled to the loop-back module 24. The test tone generator 28 is coupled and feeds test tone signals to the loop-back module 24.

The transmitter module 24 comprises a transmitter baseband module 220 and a transmitter analog module 222. The transmitter baseband module 220 comprises a transmitter IQ mismatch compensation module 2200. The transmitter analog module 222 comprises Digital-to-Analog Converters (DACs) 22200 and 22202, band pass filters 22204 and 22206, mixers 22208 and 22210, Programmable Gain Amplifier (PGA) 22212, and a first frequency divider 22214. The DAC 22200 is coupled to the band pass filter 22204, then the mixer 22208. The DAC 22202 is coupled to the band pass filter 22206, then the mixer 22210. The mixers 22208 and 22210 are coupled together, then to the PGA 22212. The first frequency divider 22214 is coupled to the mixers 22208 and 22210 and the transmitter oscillator buffer 26.

The loop-back module 24 comprises a loop-back baseband module 240 and a loop-back analog module 242. The loop-back baseband module 240 comprises a loop-back IQ mismatch detection and compensation module 2400, a transmitter IQ mismatch detection module 2402, and an oscillator phase difference detection and compensation module 2404. The loop-back analog module 242 comprises mixers 24200 and 24202, band pass filters 22204 and 22206, buffers 24208, Analog-to-Digital Converters (ADCs) 24212 and 24216, a second frequency divider 24216, and a receiver amplifier 24218. The receiver amplifier 24218 is coupled to the mixers 24200 and 24202. The mixer 24200 is coupled to the band pass filter 24204, the buffer 24208, and then to the ADC 24212. The mixer 24202 is coupled to the band pass filter 24206, the buffer 24210, and then to the ADC 24214. The second frequency divider 24216 is coupled to the mixer 24200 and 24202 to provide in-phase and quadrature oscillator signals, respectively.

The signal path along the DAC 22200, the band pass filter 22204, and the mixer 22208 is referred to as an I-path of the transmitter module 22. The I-path receives a transmitter signal x(t) to generate an in-phase component of an RF signal. The signal path along the DAC 22202, the band pass filter 22206, and the mixer 22210 is referred to as a Q-path of the transmitter analog module 222. The Q-path receives the transmitter signal x(t) to generate a quadrature component of the RF signal. The I-path and Q-path of the transmitter analog module 222 are both referred to as transmitter paths. Similarly, the signal path along the mixer 24200, the band pass filter 24204, and the ADC 24208 is referred to as an I-path of the loop-back analog module 242. The I-path receives the RF signal r(t) to generate an in-phase component of a down-converted RF signal. The signal path along the mixer 24202, the band pass filter 24206, and the ADC 24210 is referred to as a Q-path of the loop-back analog module 242. The Q-path receives the RF signal y(t) to generate a quadrature component of the down-converted RF signal. The I-path and Q-path of the transmitter module loop-back analog module 242 are both referred to as loop-back paths. The transmitter signal x(t) comprises uplink data to be transmitted to the node B in a radio access network.

The transmitter oscillator 20 generates and provides an oscillator signal to the transmitter module 20 and the loopback module 24. The oscillator signal oscillates at an oscillator frequency $\omega_{TLO}$ fed to the transmitter module 22 and the loop-back module 24, providing a carrier signal for modulation and demodulation, respectively. The oscillator frequency $\omega_{TLO}$ is a radio frequency (RF) that may be 900 MHz, 1900 MHz, or 2100 MHz in WCDMA systems, or may be 900 MHz, 2100 MHz, or 2.6 GHz in LTE systems, or others depending on the radio access technology (RAT) in use.

The transmitter module 22 converts the transmitter signal x(t) from digital to analog at the DAC 22200 and the DAC 22202, filters off unwanted signals in the transmitter signal x(t) at the filters 22204 and 22206, and up-converts the transmitter signal x(t) with the oscillator signal to generate the RF signal y(t). The transmitter signal x(t) and RF signal y(t) are orthogonal signals comprising an in-phase component and a quadrature component. The in-phase component and the quadrature component of the RF signal y(t) are combined and transmitted to the PGA 22212, which amplifies the RF signal y(t) according to an allocated power before being transmitted by an antenna (not shown).

Before using the loop-back module 24 to detect a transmitter IQ mismatch parameter and compensate for a transmitter IQ mismatch in the transmitter path, the loop-back module 24 needs to be calibrated so that no loop-back IQ mismatch remains therein. The loop-back module 24 receives a test tone signal from the test tone generator 28 and the oscillator signal from the transmitter buffer 26 to determine and reduce effects of IQ mismatch of a loop-back path in the loop-back module. The loop-back module 24 then down-converts the RF signal y(t) with the oscillator signal to determine the transmitter IQ mismatch parameter indicating the transmitter IQ mismatch in the transmitter path. In some embodiments, the transmitter 2 is utilized in a WCDMA communication device, and the loop-back module 24 detects the power level of the amplified RF signal, thereby controlling a PGA gain of the PGA 22212 to produce the amplified RF signal at the allocated power level.

The transmitter IQ mismatch compensation module 220 then further reduces effects of the transmitter IQ mismatch of a transmitter path to the transmitter signal x(t) according to the transmitter IQ mismatch parameter, before transmitting the IQ mismatch reduced transmitter signal x(t) to the transmitter analog module 222.

Figure 3:
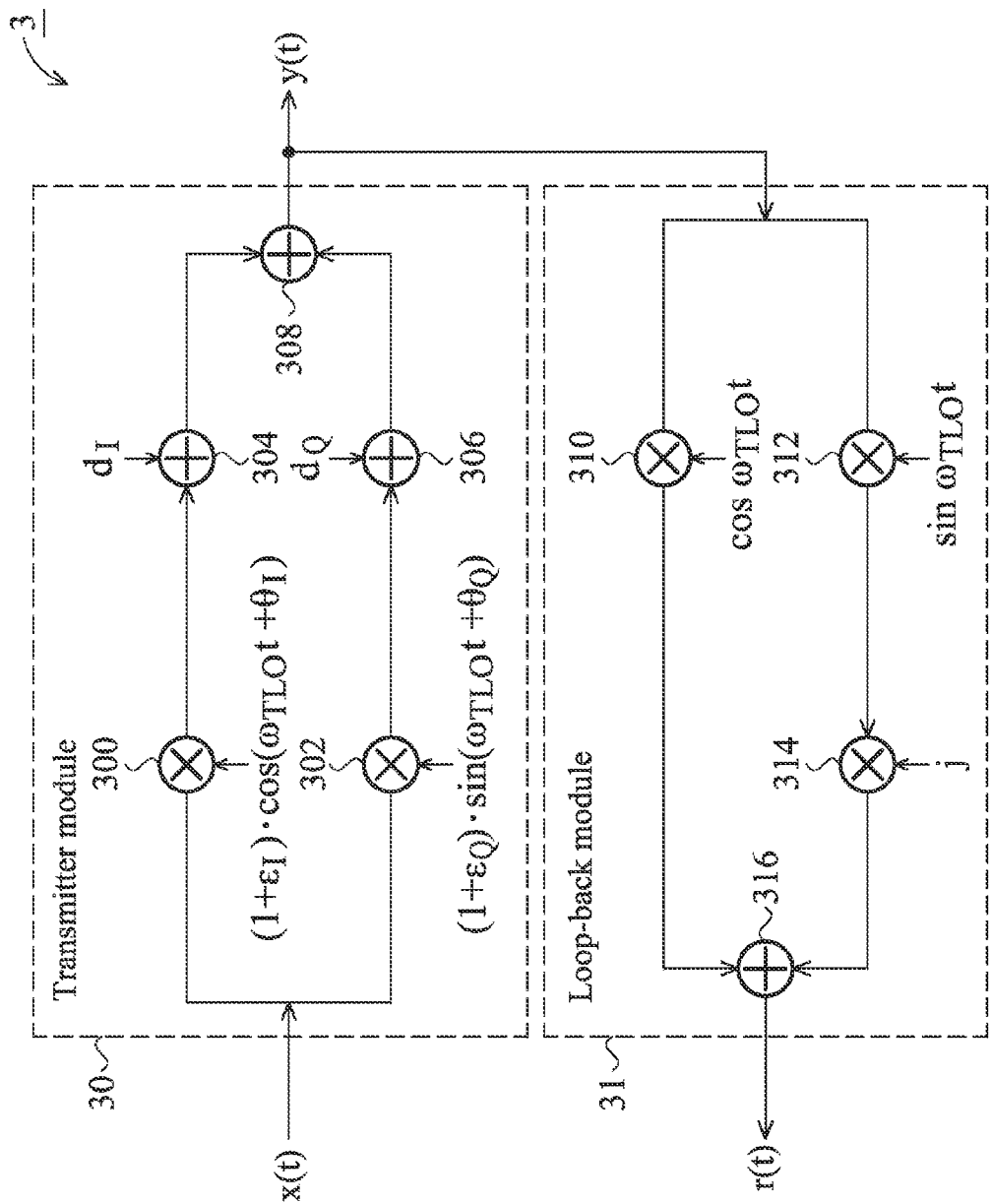
FIG. 3 is a simplified equivalent circuit of the transmitter module 22 and the loop-back module 24 in FIG. 2 after the loop-back IQ mismatch compensation.

FIG. 3 is a simplified equivalent circuit of the transmitter module 22 and the loop-back module 24 in FIG. 2 after the loop-back IQ mismatch compensation, illustrating effects of the transmitter IQ mismatch in the transmitter module 22. The equivalent circuit 3 comprises a transmitter module 30 and a loop-back module 31. The transmitter module 30 comprises mixers 300 and 302, and adders 304, 306, and 308. The mixer 300 is coupled to the adder 304, and subsequently to the adder 308. The mixer 302 is coupled to the adder 306, and then to the adder 308. The loop-back module 31 comprises mixers 310, 312, and 314, and an adder 316. The mixer 312 is coupled to the mixer 314, then to the adder 316. The mixer 310 is coupled to the adder 316.

The transmitter signal x(t) is an orthogonal signal comprising an in-phase component I and a quadrature component Q, i.e., x(t)=I+jQ. The signal path along the mixer 300 and the adder 304 is referred to as an I-path of the transmitter module 30. The I-path receives an transmitter signal x(t) to generate an in-phase component of an RF signal. The signal path along the mixer 302 and the adder 306 is referred to as a Q-path of the transmitter module 30. The Q-path receives the transmitter signal x(t) to generate a quadrature component of the RF signal. The I-path and Q-path of the transmitter module 30 are both referred to as transmitter paths.

In absence of the transmitter IQ mismatch, the RF signal y(t) is shown by:

$$y(t) = I\cos(\omega_{TLO}t) + Q\sin(\omega_{TLO}t) \qquad \text{Equation (1)}$$

where $\omega_{TLO}$ is an oscillator frequency of a transmitter oscillator (not shown), and t is time.

In presence of the transmitter IQ mismatch, a phase mismatch on the I-path is represented by $\theta_I$ and a phase mismatch on the Q-path is represented by $\theta_Q$, a gain mismatch on the I-path is represented by $(1+\epsilon_I)$ and a gain mismatch on the Q-path is represented by $(1+\epsilon_J)$. The RF signal y(t) is represented by:

$$y(t) = \frac{1}{2}(K_1 \cdot x(t) + K_2^* \cdot x^*(t))e^{j\omega_{TLO}t} \qquad \text{Equation (2)}$$

where $$K_1 = \frac{1}{2}(1+\varepsilon_I)e^{j\theta_I} + \frac{1}{2}(1+\varepsilon_Q)e^{-j\theta_Q}, \text{ and}$$

$$K_2 = \frac{1}{2}(1+\varepsilon_I)e^{-j\theta_I} - \frac{1}{2}(1+\varepsilon_Q)e^{j\theta_Q},$$

Because the loop-back IQ mismatch compensation is completed, the phase and gain IQ mismatch is absent at the loop-back module 31. The mixer 310 down-converts the RF signal y(t) with an in-phase component ($\cos \omega_{TLO} t$) of an oscillator signal to generate an in-phase component of the down-converted RF signal r(t). The mixer 312 down-converts the RF signal y(t) with a quadrature component ($\sin \omega_{TLO} t$) of an oscillator to generate a quadrature component of the down-converted RF signal r(t). The signal path along the mixer 310 is referred to as an I-path of the loop-back module 31. The signal path along the mixer 312 and the adder 314 is referred to as a Q-path of the loop-back module 31. The I-path and Q-path of the loop-back module 31 are referred to as loop-back paths.

The in-phase and quadrature components of the down-converted RF signal are combined at the adder 316. The down-converted RF signal r(t) equals:

$$r(t) = \frac{1}{2}(K_1 \cdot x(t) + K_2^* \cdot x^*) \qquad \text{Equation (3)}$$

$$= [\, i \quad j\,] \begin{bmatrix} r_I \\ r_Q \end{bmatrix}$$

$$= [\, i \quad j\,] \begin{bmatrix} (1+\varepsilon_I)\cos\theta_I & -(1+\varepsilon_Q)\sin\theta_Q \\ (1+\varepsilon_I)\sin\theta_I & (1+\varepsilon_Q)\cos\theta_Q \end{bmatrix} \begin{bmatrix} I \\ Q \end{bmatrix}$$

The down-converted RF signal r(t) is transmitted to the loop-back baseband module 240 in FIG. 2 to determine the transmitter IQ mismatch parameter.

Referring to FIG. 2, the transceiver circuit 2 is capable of reducing effects from decreased orthogonally between the in-phase and quadrature components of an orthogonal signal in the transmitter module 22, or a transmitter phase or gain IQ mismatch. The transceiver 2 detects the transmitter IQ mismatch represented by the transmitter IQ mismatch parameter, then reduces or removes the transmitter IQ mismatch according to the transmitter IQ mismatch parameter. The transceiver 2 detects the transmitter IQ mismatch by determining an I-path IQ mismatch on the I-path of the transmitter module 22 with reference to a quadrature component of 0 on the Q-path of the transmitter module 22 and a Q-path IQ mismatch on the Q-path of the transmitter module 22 with reference to a in-phase component of 0 on the I-path of the transmitter module 22, and then determines the transmitter IQ mismatch between the I-phase and Q-path according to the I-path IQ mismatch and Q-path IQ mismatch.

After the loop-back IQ mismatch at the loop-back module 24 is compensated for, the transceiver 2 may detect and compensate for the transmitter IQ mismatch using the loop-back path. The transmitter baseband module 220 sets one of an in-phase component and a quadrature component of the transmitter signal to a zero signal to derive a first mismatch parameter of the transmitter IQ mismatch parameter, and sets the other one of the in-phase component and the quadrature component of the transmitter signal to a zero signal to derive a second mismatch parameter of the transmitter IQ mismatch parameter. In one example, the transmitter baseband module 220 sets the in-phase component $x_I(t)$ of the transmitter signal to a first non-zero signal I' and the quadrature component $x_Q(t)$ of the transmitter signal to a zero signal to determine an I-path mismatch parameter (first mismatch parameter), and sets the in-phase component $x_I(t)$ of the transmitter signal to a zero signal and the quadrature component $x_Q(t)$ of the transmitter signal to a second non-zero signal Q' to determine a Q-path mismatch parameter (second mismatch parameter). The transmitter IQ mismatch detection module 2402 then determines the transmitter IQ mismatch parameter comprises based on the I-path mismatch parameter and the Q-path mismatch parameter, so that the transmitter IQ mismatch compensation module 2200 can use the transmitter IQ mismatch parameter to reduce the effects of the transmitter IQ mismatch. The first non-zero signal I' may be a DC signal, a sinusoidal signal, or any signal or signal combination that is not 0. For example, the first non-zero signal may be sin(ωt). The second non-zero signal Q' may be a DC signal, a sinusoidal signal, or any signal or signal combination that is not 0. The second non-zero signal may be, for example, sin(ωt). The first and second non-zero signals may be identical or different. The identical first and second non-zero signals may simplify the determination of the transmitter IQ mismatch parameter. Matched in-phase and quadrature components of the orthogonal signal are characterized by no DC difference, or DC offset, to each other, an orthogonal relationship, or 90 degree out-of-phase, and equal amplitude, or a gain of 1. In embodiments of the present invention, the transmitter IQ mismatch may be a phase mismatch and/or an amplitude (gain) mismatch.

In one embodiment, the transmitter IQ mismatch parameter indicates a phase mismatch of the signals on the I-path and the Q-path of the transmitter module 22. The transmitter baseband module 220 sets the in-phase component $x_I(t)$ of the transmitter signal to the first non-zero signal I' and the quadrature component $x_Q(t)$ of the transmitter signal to the zero signal to generate the down-converted RF signal r(t), represented by:

$$r_{I-Path}(t) = [i \quad j] \begin{bmatrix} r_{I\_IPATH} \\ r_{Q\_IPATH} \end{bmatrix} \qquad \text{Equation (4)}$$

$$= [i \quad j] \begin{bmatrix} (1+\varepsilon_I)\cos\theta_I \cdot I' & 0 \\ (1+\varepsilon_I)\sin\theta_I \cdot I' & 0 \end{bmatrix}$$

The transmitter IQ mismatch detection module 2402 determines the I-path mismatch parameter $\theta_I$ according to the in-phase component and the quadrature component of the down-converted RF signal r(t), where:

$$\theta_I \approx \tan\theta_I = r_Q(I',0)/r_I(I',0) \qquad \text{Equation (5)}$$

The transmitter baseband module 220 sets the in-phase component $x_I(t)$ of the transmitter signal to the zero signal and the quadrature component $x_Q(t)$ of the transmitter signal to the first non-zero signal Q' to generate the down-converted RF signal r(t), represented by:

$$r_{Q-Path}(t) = [i \quad j] \begin{bmatrix} r_{I\_QPATH} \\ r_{Q\_QPATH} \end{bmatrix} \qquad \text{Equation (6)}$$

$$= [i \quad j] \begin{bmatrix} 0 & -(1+\varepsilon_Q)\sin\theta_Q \cdot Q' \\ 0 & (1+\varepsilon_Q)\sin\theta_Q \cdot Q' \end{bmatrix}$$

The transmitter IQ mismatch detection module 2402 determines the Q-path mismatch parameter $\theta_Q$ according to the in-phase component and the quadrature component of the down-converted RF signal r(t) as follows:

$$\theta_Q \approx \tan\theta_Q = r_I(0,Q')/r_Q(0,Q') \qquad \text{Equation (7)}$$

The transmitter IQ mismatch detection module 2402 determines the transmitter IQ mismatch parameter θ according to the I-path mismatch parameter $\theta_I$ and the Q-path mismatch parameter $\theta_Q$. In one embodiment, the transmitter IQ mismatch detection module 2402 determines the transmitter IQ mismatch parameter θ by determining a difference of the I-path mismatch parameter and the Q-path mismatch parameter, i.e., $\theta = \theta_I - \theta_Q$. The transmitter IQ mismatch parameter θ may be transmitted and kept at a register, or any memory unit in the transmitter IQ mismatch compensation module 2200, so that the transmitter baseband module 220 can access the memory unit to obtain the transmitter IQ mismatch parameter θ and compensate for the transmitter signal x(t) before outputting the compensated transmitter signal x(t) to the transmitter analog module 222. The transmitter IQ mismatch compensation module 220 then reduces the effects of the IQ mismatch of the transmitter path in the transmitter module 22 according to a phase compensation matrix of the transmitter IQ mismatch parameter:

$$M_\theta = \begin{bmatrix} 1 & -\tan\theta \\ -\tan\theta & 1 \end{bmatrix} \qquad \text{Equation (8)}$$

The transmitter IQ mismatch compensation module 220 then reduces effects of IQ mismatch of a transmitter path in the transmitter module 22 according to the phase compensation matrix of the transmitter IQ mismatch parameter. The phase compensation matrix $M_\theta$ may be implemented by a circuit depicted in FIG. 5.

In another embodiment, the transmitter IQ mismatch parameter indicates a gain mismatch between an I-path and a Q-path of the transmitter module 22. The transmitter baseband module 220 sets the in-phase component $x_I(t)$ of the transmitter signal to the first non-zero signal I' and the quadrature component $x_Q(t)$ of the transmitter signal to the zero signal to generate the down-converted RF signal r(t), represented by the Equation (4). The transmitter IQ mismatch detection module 2402 determines the I-path mismatch parameter $(1+\varepsilon_I)$ according to the in-phase component I' of the transmitter signal, in-phase component $r_I(I', 0)$ and the quadrature component $r_Q(I', 0)$ of the down-converted RF signal, as shown by:

$$1 + \varepsilon_I = \frac{\sqrt{(r_{I\_IPATH}^2 + r_{Q\_IPATH}^2)}}{I'} \quad \text{Equation (9)}$$

The transmitter baseband module 220 sets the in-phase component $x_I(t)$ of the transmitter signal to the zero signal and the quadrature component $x_Q(t)$ of the transmitter signal to the first non-zero signal Q' to generate the down-converted RF signal r(t), shown as Equation (6).

The transmitter IQ mismatch detection module 2402 determines the Q-path mismatch parameter $(1+\varepsilon_Q)$ according to the quadrature component Q' of the transmitter signal, the in-phase component $r_I(0, Q')$ and the quadrature component $r_Q(0, Q')$ of the down-converted RF signal, as shown by:

$$1 + \varepsilon_Q = \frac{\sqrt{(r_{I\_QPATH}^2 + r_{Q\_QPATH}^2)}}{Q'} \quad \text{Equation (10)}$$

The transmitter IQ mismatch detection module 2402 determines the gain mismatch G between the I-path and the Q-path according to the I-path mismatch parameter $(1+\varepsilon_I)$ and the Q-path mismatch parameter $(1+\varepsilon_Q)$. The loop-back module 24 determines the transmitter IQ mismatch parameter G by:

$$G = \frac{(1+\varepsilon_I)}{(1+\varepsilon_Q)} = \frac{\sqrt{(r_{I\_IPATH}^2 + r_{Q\_IPATH}^2)}}{(r_{I\_QPATH}^2 + r_{Q\_QPATH}^2)} \cdot \frac{Q'}{I'} \quad \text{Equation (11)}$$

where:

$(1+\varepsilon_Q)$ is the I-path mismatch parameter;

$(1+\varepsilon_Q)$ is the Q-path mismatch parameter;

$r_{I\_IPATH}^2(t)$ and $r_{Q\_IPATH}^2(t)$ are the in-phase and quadrature component of the down-converted RF signal r(t) respectively when the in-phase component $x_I(t)$ of the transmitter signal is the first non-zero signal I' and the quadrature component $x_Q(t)$ of the transmitter signal is a zero signal;

$r_{I\_QPATH}^2(t)$ and $r_{Q\_QPATH}^2(t)$ are the in-phase and quadrature component of the down-converted RF signal r(t) respectively when the in-phase component $x_I(t)$ of the transmitter signal is a zero signal and the quadrature component $x_Q(t)$ of the transmitter signal is the second non-zero signal Q'; and I' is the first non-zero in-phase component $x_I(t)$ of the transmitter signal, and Q' is the second non-zero quadrature component $x_Q(t)$ of the transmitter signal.

The transmitter IQ mismatch parameter G may be transmitted and kept at a register, or any memory unit in the transmitter IQ mismatch compensation module 2200, so that the transmitter baseband module 220 can access the memory unit to obtain the transmitter IQ mismatch parameter G and compensate for the transmitter signal x(t) before outputting the compensated transmitter signal to the transmitter analog module 222. The transmitter baseband module 220 then reduces the effects of the IQ mismatch of the transmitter path in the transmitter module 22 according to a gain compensation matrix of the transmitter IQ mismatch parameter:

$$M_G = \begin{bmatrix} 1 & 0 \\ 0 & \frac{(1+\varepsilon_I)}{(1+\varepsilon_Q)} \end{bmatrix} \quad \text{Equation (12)}$$

Figure 6:
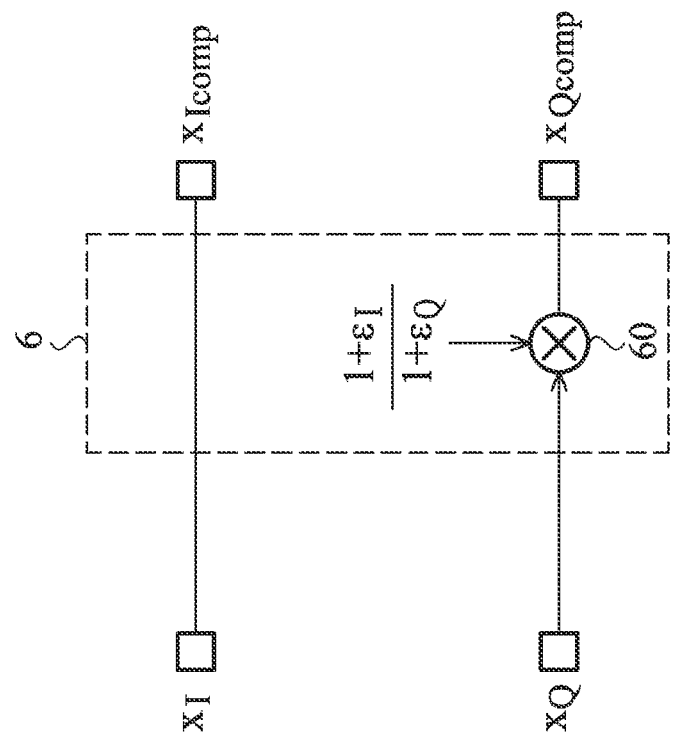
FIG. 6 is a circuit diagram of an exemplary IQ gain mismatch compensation circuit according to the present invention.

The phase compensation matrix $M_G$ may be implemented by a circuit depicted in FIG. 6. In one embodiment, the first non-zero signal I' equals the first non-zero signal Q', so that the transmitter IQ mismatch detection module 2402 can determine the gain mismatch between the I-path and the Q-path only according to the in-phase component $r_I(I', 0)$ and the quadrature component $r_Q(I', 0)$ of the down-converted RF signal, and the in-phase component $r_I(0, Q')$ and the quadrature component $r_Q(0, Q')$ of the down-converted RF signal, i.e.:

$$G = \frac{(1+\varepsilon_I)}{(1+\varepsilon_Q)} = \frac{\sqrt{(r_{I\_IPATH}^2(t) + r_{Q\_IPATH}^2(t))}}{(r_{I\_QPATH}^2(t) + r_{Q\_QPATH}^2(t))}. \quad \text{Equation (13)}$$

The transmitter IQ mismatch compensation module 220 then reduces effects of IQ mismatch of a transmitter path in the transmitter module 22 according to the gain compensation matrix of the transmitter IQ mismatch parameter.

The first frequency divider 22216 divides the oscillation frequency of the oscillator signal by two to generate the first oscillator signal, and up-converts the transmitter signal with the first oscillator signal to generate the RF signal, and the second frequency divider 24216 divides the oscillation frequency of the oscillator signal by two to generate the second oscillator signal, and down-converts the transmitter signal with the second oscillator signal to generate a baseband signal. The first and second oscillator signals to up-convert the transmitter signal x(t) and down-convert the RF signal y(t) are provided from the first frequency divider 22216 and the second frequency divider 24216 separately, resulting in different oscillator signal paths to the up-converted mixers 22208, 22210 and down-converted mixers 24200, 24202. Since the first and second oscillator signals are produced through different circuit elements and paths, there is an oscillator phase difference between the first and second oscillator signals, rendering an oscillator phase difference φ that needs to be compensated for. The oscillator phase difference φ is a phase difference of the signals on the transmitter path and the loop-back path, arising from different oscillator signal paths to the up-converted mixers of the transmitter module 22 and the down-converted mixers of the loop-back module 24.

The oscillator phase difference φ is derived by the down-converted RF signal r(t). The transmitter baseband module 220 sets the in-phase and quadrature components of the transmitter signal to zero signals to determine the down-converted RF signal r(t) as a first oscillator phase difference parameter $r_{LO1}(t)$ at the oscillator phase difference detection and compensation module 2404. The first oscillator phase difference parameter represents a phase difference of the first and second oscillator signals when the in-phase and quadrature components of the transmitter signal are 0. The transmitter baseband module 220 sets one of an in-phase component and a quadrature component of the transmitter signal to a zero signal to derive a first mismatch parameter of the transmitter IQ mismatch parameter. Specifically, the transmitter baseband module 220 may set the in-phase component $x_I(t)$ of the transmitter signal to a non-zero constant signal and the quadrature component $x_Q(t)$ of the transmitter signal to a zero signal to determine the down-converted RF signal r(t) as a second oscillator phase difference parameter $r_{LO2}(t)$ at the oscillator phase difference detection and compensation module 2404. The second oscillator phase difference parameter represents a phase difference of the first and second oscillator signals when the in-phase component of the transmitter signal is a DC voltage and the quadrature components of the transmitter signal is 0.

Next the oscillator phase difference detection and compensation module 2404 determines an oscillator phase difference parameter according to the first and second oscillator phase difference parameters $r_{LO1}(t)$ and $r_{LO2}(t)$, and reduces the oscillator phase difference $\phi$ between the first and second oscillator signals according to the oscillator phase difference parameter $(-\theta_I-\phi)$. The oscillator phase difference detection and compensation module 2404 determines the oscillator phase difference parameter $(-\theta_I-\phi)$ according to a difference of the first and second oscillator phase difference parameters, or, $$(-\theta_I-\phi)=r_{LO1}(t)-r_{LO2}(t) \quad \text{Equation (14)}$$

The oscillator phase difference detection and compensation module 2404 performs a digital rotation operation on the down-converted RF signal $r(t)$ with the oscillator phase difference parameter $(-\theta_I-\phi)$ to reduce or remove the oscillator phase difference $\phi$, resulting in a residue phase mismatch $-\theta_I$ in the oscillator phase difference compensated signal $r(t)$. The residue phase mismatch $-\theta_I$ may be subsequently removed by the transmitter IQ mismatch compensation module 2200 using the transmitter IQ mismatch detection and compensation method of the embodiment of the present invention. Thus the oscillator phase difference detection and compensation module 2404 is configured to reduce the oscillator phase difference prior to the transmitter module reducing the transmitter IQ mismatch of the transmitter path. The digital rotation of an angle $(-\theta_1-\phi)$ may be implemented by a circuit provided in FIG. 7.

A receiver device (not shown) may be incorporated with the transmitter device 2 to form a transceiver device (not shown) in the communication device 10 in FIG. 1. The receiver device receives a downlink RF signal from the base station 12, down-converts the downlink RF signal by receiver mixers (not shown), and converts to digital baseband signals by receiver ADCs to be processed in a receiver baseband module (not shown). The downlink RF signal is also an orthogonal signal.

Those skilled in the art will recognize that some components not illustrated may be incorporated in the I-path and Q-path of the transmitter device 2, such as various low-pass, high-pass, and band-pass filters designed to remove unwanted signal components and buffer stages to enhance signal strength. However, the various filtering and buffer components introduced to the I-path and Q-path of the transceiver 1 may increase the phase and amplitude differences or mismatch between the in-phase and quadrature components of the signals in the transmitter device 2.

While various circuit functions are performed by different modules in the transmitter device 2, the modules may be separated, combined, or partially combined to perform the circuit functions illustrated in the embodiments of the present invention, such that the circuit functions may also be separated, combined, or partially combined without deviating from the principle of the invention.

Figure 4:
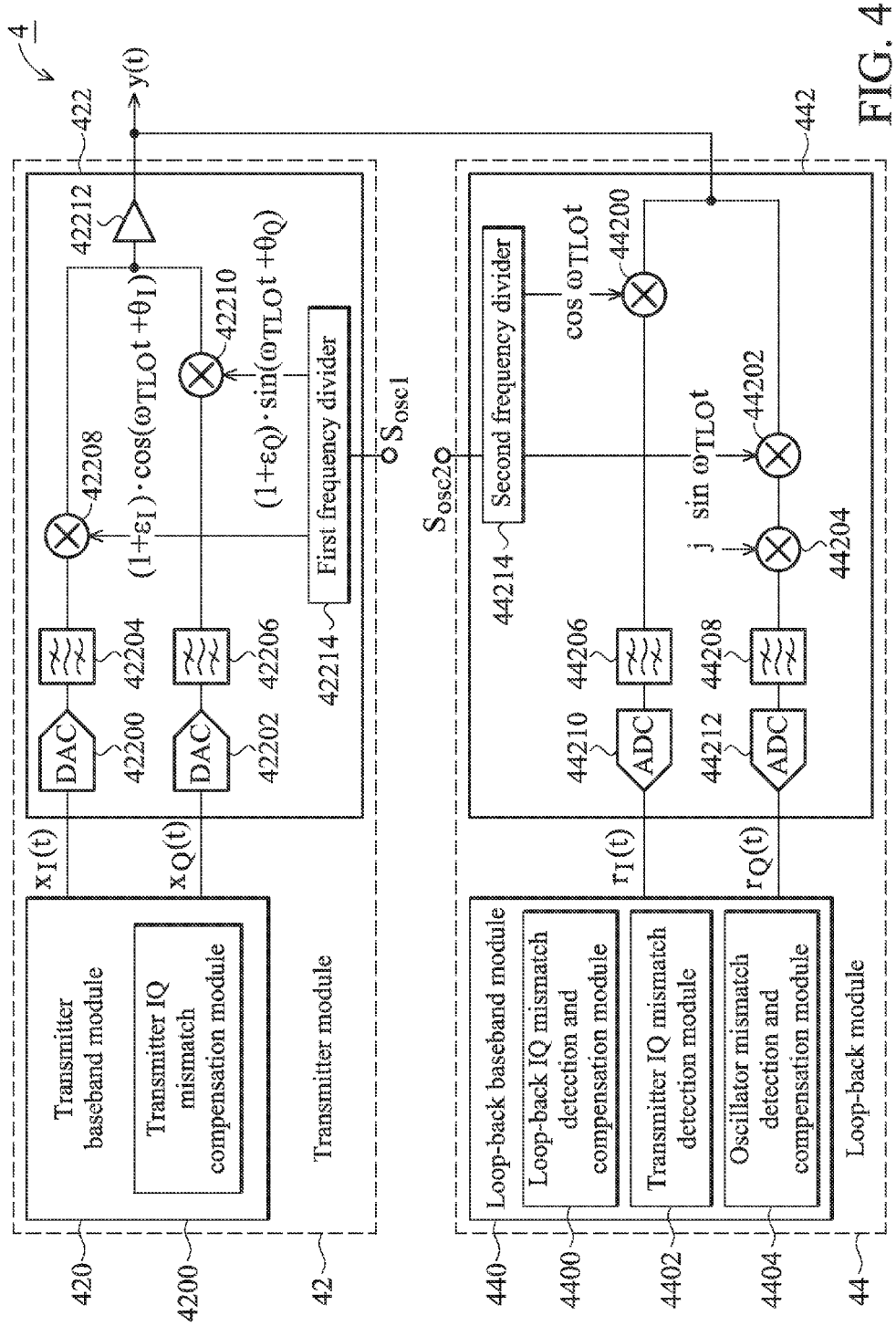
FIG. 4 is a block diagram of another exemplary device with IQ mismatch compensation according to the present invention.

FIG. 4 is a block diagram of another exemplary transmitter device 4 capable of IQ mismatch compensation according to one embodiment of the present invention.

The transmitter device 4 is identical to the transmitter device 2 in FIG. 2, except that the transmitter module 42 and the loop-back module 44 employ different sources of oscillator signals $S_{osc1}$, $S_{osc2}$. The oscillator signals $S_{osc1}$, $S_{osc2}$ provide substantially the same oscillator frequency and are originated from two separated oscillator units (not shown). The transmitter device 4 uses the same transmitter IQ mismatch compensation technique as explained in the embodiments in the transmitter device 2.

Figure 5:
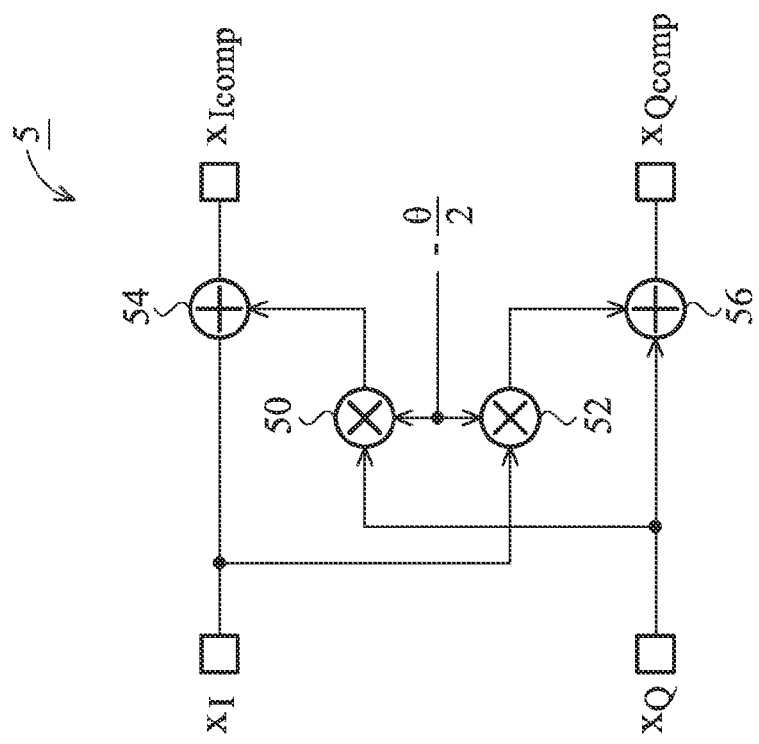
FIG. 5 is a circuit diagram of an exemplary IQ phase mismatch compensation circuit according to the present invention.

FIG. 5 is a circuit diagram of an exemplary IQ phase mismatch compensation circuit 5 according to one embodiment of the present invention, incorporated in the transmitter IQ mismatch compensation module 2200 in FIG. 2 or the transmitter IQ mismatch compensation module 4200 in FIG. 4. The IQ phase mismatch compensation circuit 5 comprises mixers 50 and 52, and adders 54 and 56. The mixer 50 is coupled to the adder 54. The mixer 52 is coupled to the adder 56. The mixer 50 adjusts a phase of the quadrature component of the transmitter signal by $(-\theta/2)$, where $(\theta/2)$ is the gain IQ mismatch. Similarly, the mixer 52 adjusts a phase of the in-phase component of the transmitter signal by $(-\theta/2)$, where $(\theta/2)$ is the gain IQ mismatch. The adder 54 combines the in-phase component of the transmitter RF signal and the adjusted quadrature component of the transmitter signal to reduce the gain IQ mismatch and provide a compensated in-phase component of the transmitter RF to the transmitter analog module in FIG. 2 or FIG. 4. Likewise, the adder 56 combines the quadrature component of the transmitter RF signal and the adjusted in-phase component of the transmitter signal to reduce the phase IQ mismatch and provide a compensated quadrature component of the transmitter RF to the transmitter analog module in FIG. 2 or FIG. 4.

FIG. 6 is a circuit diagram of an exemplary IQ gain mismatch compensation circuit 6 according to one embodiment of the present invention, incorporated in the transmitter IQ mismatch compensation module 2200 in FIG. 2 or the transmitter IQ mismatch compensation module 4200 in FIG. 4. The IQ gain mismatch compensation circuit 6 comprises a mixer 60. The mixer 60 adjusts an amplitude of the quadrature component of the transmitter signal by a factor $(1+\epsilon_I)/(1+\epsilon_Q)$, so that an amplitude of the in-phase component of the transmitter signal is substantially equivalent to the amplitude of the quadrature component of the transmitter signal, thereby providing the gain IQ mismatch compensation.

Figure 7:
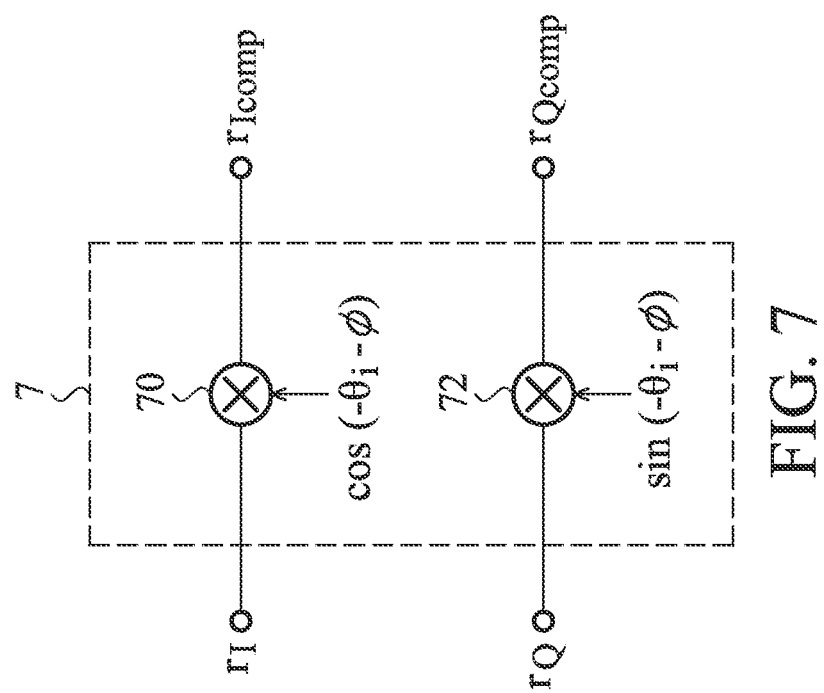
FIG. 7 is a circuit diagram of an exemplary oscillator phase difference compensation circuit according to the present invention.

FIG. 7 is a circuit diagram of an exemplary oscillator phase difference compensation circuit 7 according to one embodiment of the present invention, incorporated in the oscillator phase difference detection and compensation module 2404 in FIG. 2 or the transmitter oscillator phase difference detection and compensation module 4404 in FIG. 4. The oscillator phase difference compensation circuit 7 comprises mixers 70 and 72. The mixer 70 adjusts a phase of the in-phase component of the down-converted RF signal by $(-\theta_I-\phi)$ to reduce the oscillator phase difference. The mixer 72 adjusts a phase of the quadrature component of the down-converted RF signal by $(-\theta_I\phi)$. The adjusted in-phase and quadrature components of the down-converted RF signal may be transmitted to the transmitter IQ mismatch detection module in FIG. 2 or FIG. 4 for signal processing.

Figure 8:
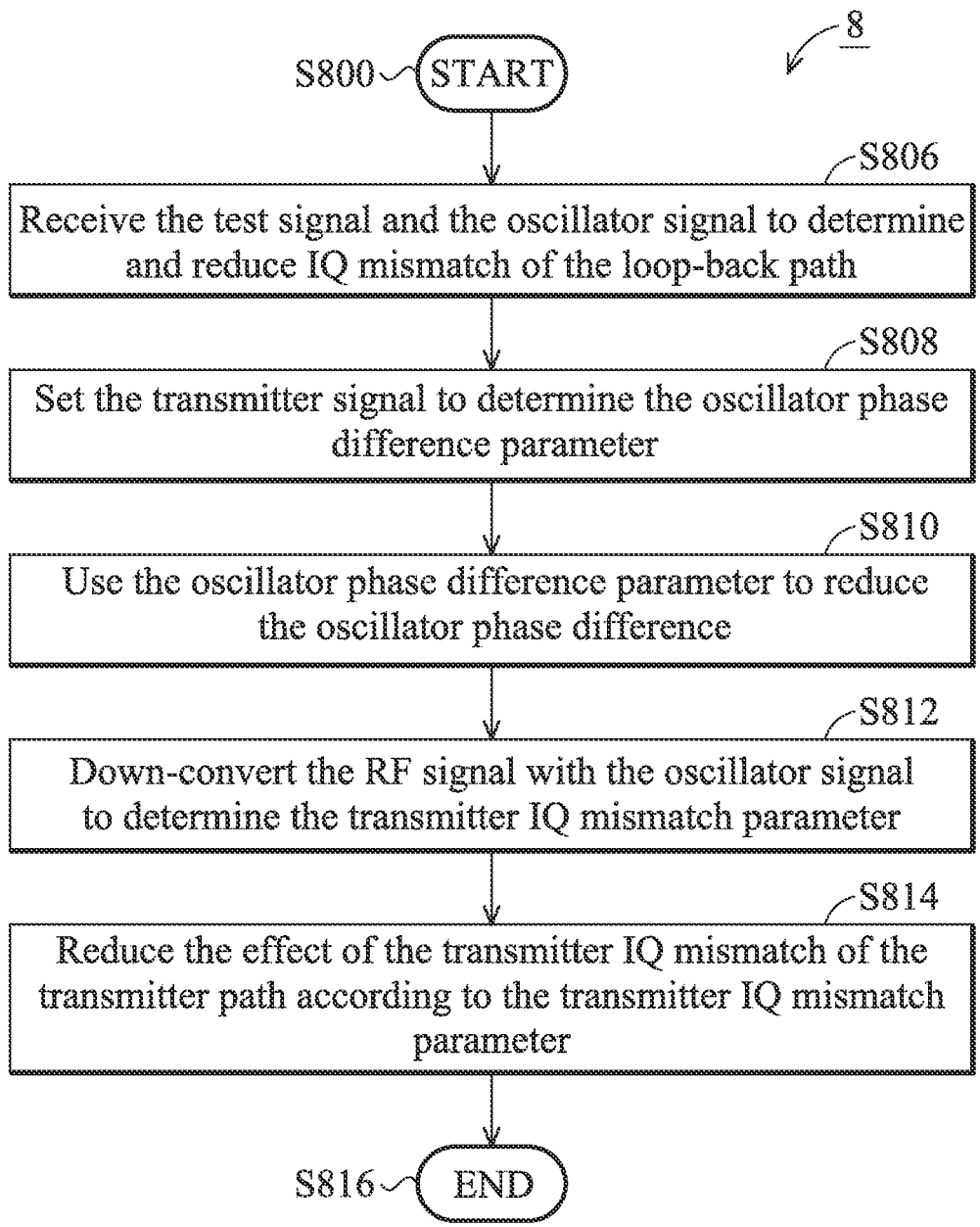
FIG. 8 is a flowchart of an exemplary IQ mismatch and oscillator phase difference detection and compensation method according to present invention.

FIG. 8 is a flowchart of an exemplary IQ and oscillator phase difference detection and compensation method according to one embodiment of the present invention. The compensation method 8 may incorporate the IQ mismatch compensation circuit in FIG. 2. The IQ mismatch comprises phase and gain mismatch. The method is used in either a frequency division duplexing or a time division duplexing system.

Upon startup of the IQ and oscillator phase difference detection and compensation method 8, the transmitter circuit 2 is initiated in step S800 prior to uplink data transmission.

In step S806, the loop-back module 24 receives the test signal and the oscillator signal to determine and reduce the effects of the IQ mismatch of the loop-back path. The IQ mismatch of the loop-back path needs to be compensated for prior to the transmitter IQ mismatch compensation, so that the loop-back module 24 may detect the transmitter IQ mismatch, and the local IQ mismatch of the loop-back path does not affect the detection of the transmitter IQ mismatch, thereby allowing for a higher accuracy in determining the transmitter IQ mismatch. The test signal is provided from the test tone generator 28.

Figure 9:
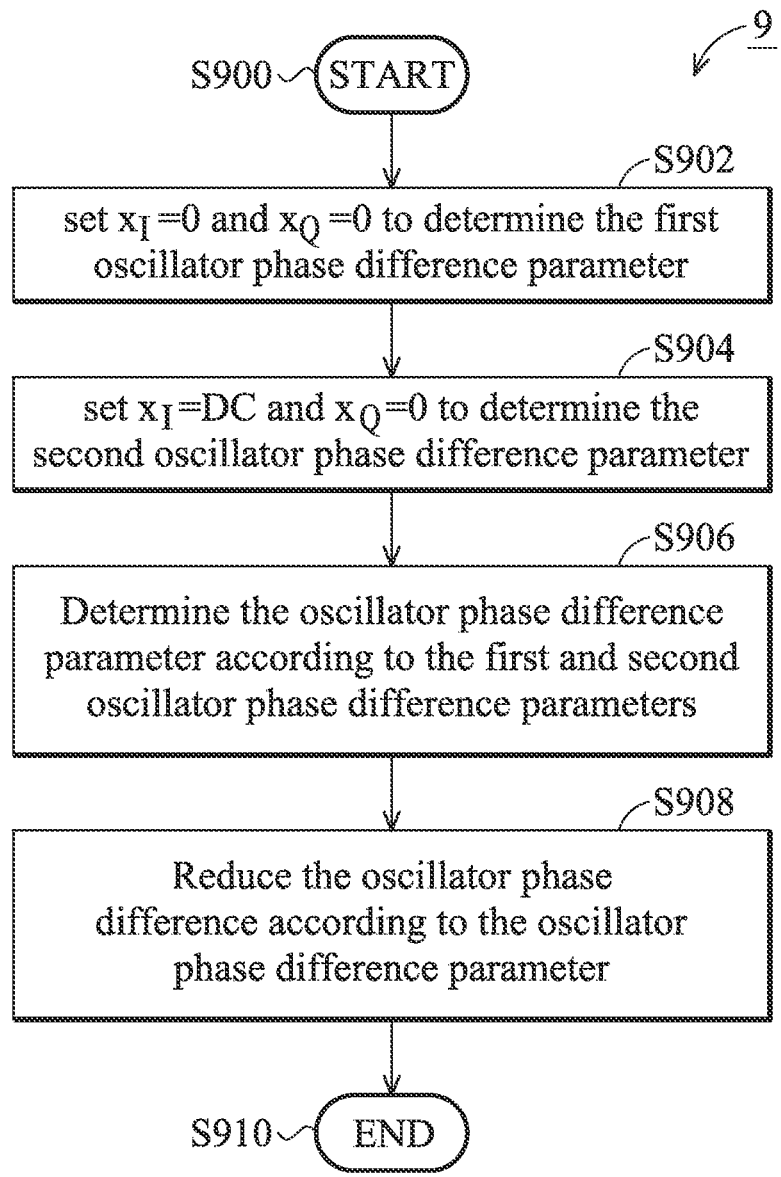
FIG. 9 is a flowchart of an exemplary oscillator phase difference detection and compensation method according to present invention.

In step S808, the transmission module 22 sets the transmitter signal x(t) to determine the oscillator phase difference parameter $(-\theta_I-\phi)$. The transmitter oscillator 20 provides the oscillator signal to the transmission module 22 and the loop-back module 24 to perform modulation and demodulation, respectively. Since the oscillator signals are provided separately to the transmission module 22 and the loop-back module 24, the oscillator phase difference $\phi$ is arose from the different oscillator signal paths to the transmitter module 22 and the loop-back module 24. The oscillator phase difference $\phi$ between the transmitter path and the loop-back path has to be compensated for, so that the transmitter IQ mismatch can be determined at a higher accuracy. FIG. 9 discloses a detailed method of determination of the oscillator phase difference parameter.

In step S810, the loop-back module 24 uses the phase mismatch parameter $(-\theta_I-\phi)$ to reduce the oscillator phase difference $\phi$ by digitally rotating the phase of the down-converted RF signal r(t) by an angle $(-\theta_I-\phi)$. The digital rotation may be implemented by the oscillator phase difference compensation circuit 7 in the FIG. 7. The down-converted RF signal r(t) still comprises the residue phase mismatch $(-\theta_I)$ after the digital rotation. The residue phase mismatch $(-\theta_I)$ can be reduced or removed using steps S812 and S814. Thus the reduction of the oscillator phase difference in step 810 has to be performed prior to reducing the transmitter IQ mismatch of the transmitter path. FIG. 9 discloses the detailed method of the oscillator phase difference compensation.

Figure 10:
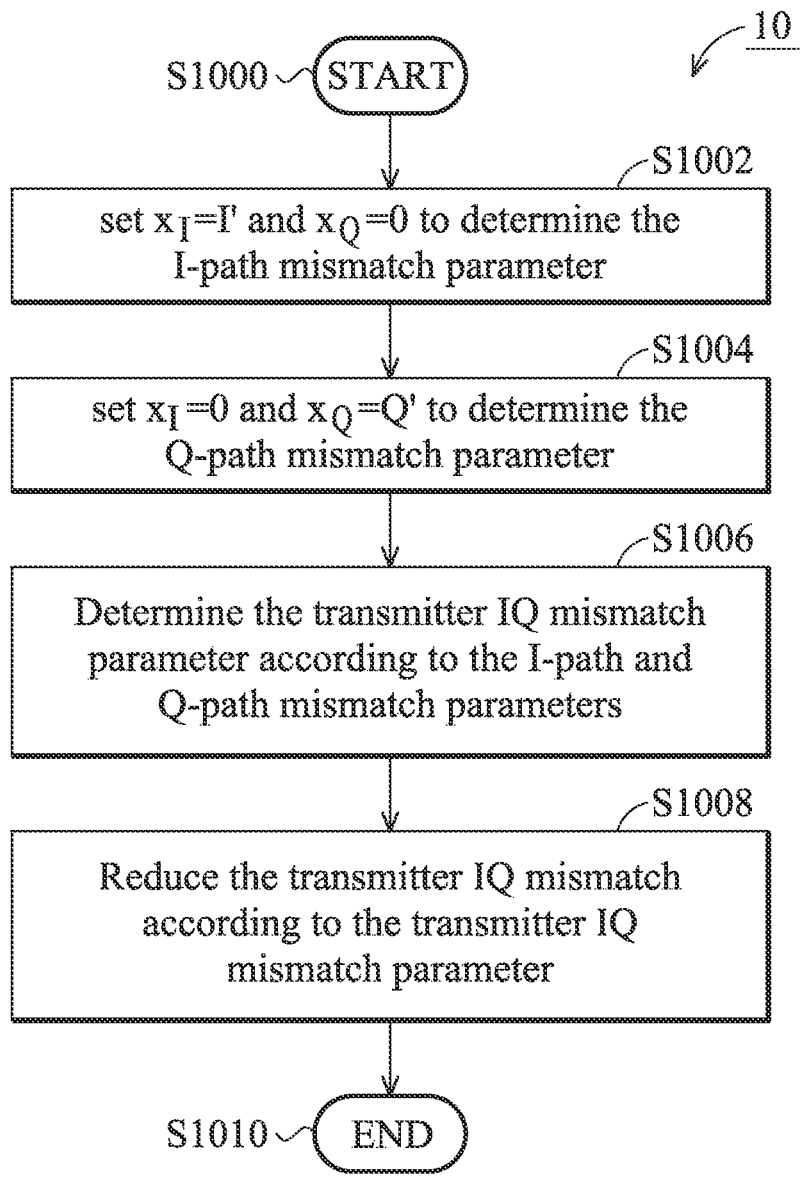
FIG. 10 is a flowchart of an exemplary IQ mismatch detection and compensation method according to present invention.

In step S812, the loop-back module 24 down-converts the RF signal with the oscillator signal to determine the transmitter IQ mismatch parameter. The transmitter IQ mismatch parameter may represent the phase IQ mismatch of the transmitter module 22, the gain IQ mismatch of the transmitter module 22, or a combination thereof. FIG. 10 discloses a detailed method of determination of the transmitter IQ mismatch.

In step S814, the transmitter module 22 reduces the effects of the transmitter IQ mismatch of the transmitter path according to the transmitter IQ mismatch parameter, thereby providing the IQ matched RF signal for uplink data transmission and decreasing inter-channel interference and transmit power usage. FIG. 10 provides the detailed method of compensation of the transmitter IQ mismatch.

In step S816, the mismatch detection and compensation method 8 is completed.

The mismatch detection and compensation method 8 utilizes the loop-back module 24 that shares a common oscillator signal source (the transmitter oscillator 20) with the transmitter module 22 to detect and compensate for the transmitter IQ mismatch, leading to decreased circuit complexity and reduced manufacturing costs.

FIG. 9 is a flowchart of an exemplary oscillator phase difference calibration method according to one embodiment of the present invention, incorporated in the steps S808 and S810 in the method 8. The oscillator phase difference calibration method 9 may incorporate the transmitter circuit 2 in FIG. 2 and the oscillator phase difference compensation circuit 7 in the FIG. 7.

Upon startup, the transmitter circuit 2 is initiated to perform the oscillator phase difference calibration method 9 in step S900. The oscillator phase difference is the phase difference of the signals on the transmitter path and the loopback path, arising from different oscillator signal paths to the transmitter module 22 and the loop-back module 24.

In step S902, the transmitter module 22 sets the in-phase and quadrature components of the transmitter signal to zero signals to determine the first oscillator phase difference parameter $r_{LO1}$.

In step S904, the transmitter module 22 sets one of the in-phase component and the quadrature component of the transmitter signal to a non-zero constant signal and set the other one of the in-phase component and the quadrature component of the transmitter signal to a zero signal to determine a second oscillator phase difference parameter. In one example, the transmitter module 22 sets the in-phase component of the transmitter signal to the non-zero constant signal and the quadrature component of the transmitter signal to the zero signal to determine second oscillator phase difference parameter $r_{LO2}$. The non-zero constant signal may be, for example, 1.8V.

In step S906, the loop-back module 24 determines the oscillator phase difference parameter $(-\theta_I-\phi)$ according to the difference of the first and second oscillator phase difference parameters.

In step S908, the loop-back module 24 reduces the oscillator phase difference $\phi$ between the first and second oscillator signals according to the oscillator phase difference parameter $(-\theta_I-\phi)$ by the oscillator phase difference compensation circuit 7 in the FIG. 7. The oscillator phase difference compensation circuit 7 adjusts the phase of the down-converted signal r(t) by $(-\theta_I-\phi)$ to compensate for the oscillator phase difference (I), resulting in the residue phase mismatch $(-\theta_I)$ that needs to be further compensated for. The phase compensation of the residue phase mismatch $(-\theta_I)$ can be implemented by the IQ mismatch calibration method 10 in FIG. 10, thus the methods 9 and 10 are used in conjunction, and in order, to substantially remove the oscillator phase difference.

In step S910, the oscillator phase difference calibration method 9 is stopped.

FIG. 10 is a flowchart of an exemplary IQ mismatch calibration method 10 according to one embodiment of the present invention. The IQ mismatch calibration method 10 may be incorporated in the steps S812 and S814 in the method 8, or may be used independently to correct the IQ mismatch of a transmitter path in a transmitter device. The IQ mismatch calibration method 10 may incorporate the transmitter circuit 2 in FIG. 2, the transmitter circuit 4 in FIG. 4, the IQ phase mismatch compensation circuit 5 in FIG. 5, and the IQ gain mismatch compensation circuit 6 in FIG. 6.

Upon startup of the method 10, the transmitter circuit 2 is initiated to perform the IQ mismatch calibration method 10 in step S1000. Next in step S1002, the transmitter module 22 sets one of an in-phase component and a quadrature component of the transmitter signal to a zero signal to derive a first mismatch parameter of the transmitter IQ mismatch parameter. In one example, the transmitter module 22 sets the in-phase component of the transmitter signal to the first non-zero signal and the quadrature component of the transmitter signal to the zero signal to determine the I-path mismatch parameter (first mismatch parameter). The first non-zero signal I' may be a DC signal, a sinusoidal signal, or any signal or signal combination that is not 0. For example, the first non-zero signal may be sin(ωt). The I-path mismatch parameter represents the phase or gain mismatch of the I-component on the I-path with reference to the zero signal on the Q-path in the transmitter analog module 222. In one embodiment, the I-path mismatch parameter represents the phase mismatch of the signal on the I-path relative to a 0 signal on the Q-path, and the loop-back module 24 determines the I-path mismatch parameter $\theta_I$ according to the in-phase component and the quadrature component of the down-converted RF signal ($r_{I\_IPATH}$, $r_{Q\_IPATH}$), as expressed in Equation (5). In another embodiment, the I-path mismatch parameter represents the gain mismatch of the signal on the I-path relative to a 0 signal on the Q-path, and the loop-back module 24 determines the I-path mismatch parameter ($1+\epsilon_I$) according to the first non-zero signal I', in-phase component and the quadrature component of the down-converted RF signal ($r_{I\_IPATH}$, $r_{Q\_IPATH}$), as expressed by Equation (9).

In step S1004, the transmitter module 22 sets the other one of the in-phase component and the quadrature component of the transmitter signal to a zero signal to derive a second mismatch parameter of the transmitter IQ mismatch parameter. In one example, the transmitter module 22 sets the in-phase component of the transmitter signal to the zero signal and the quadrature component of the transmitter signal to the second non-zero signal to determine the Q-path mismatch parameter (second mismatch parameter). The second non-zero signal Q' may be a DC signal, a sinusoidal signal, or any signal or signal combination that is not 0. The second non-zero signal may be, for example, 1.8V. The first and second non-zero signal may or may not be identical. The I-path mismatch parameter represents the phase or gain mismatch of the Q-component on the Q-path with reference to the zero signal on the I-path in the transmitter analog module 222. In one embodiment, the Q-path mismatch parameter represents the phase mismatch of the signal on the Q-path relative to a 0 signal on the I-path, and the loop-back module 24 determines the Q-path mismatch parameter $\theta_Q$ according to the in-phase component and the quadrature component of the down-converted RF signal, as expressed in Equation (7). In another embodiment, the Q-path mismatch parameter represents the gain mismatch of the signal on the Q-path relative to a 0 signal on the I-path, and the loop-back module 24 determines the I-path mismatch parameter ($1+\epsilon_Q$) according to the second non-zero signal Q', in-phase component and the quadrature component of the down-converted RF signal ($r_{I\_PATH}$, $r_{Q\_IPATH}$), as indicated by Equation (10).

In step S1006, the loop-back module 24 determines the transmitter IQ mismatch parameter based on the I-path mismatch parameter and the Q-path mismatch parameter. The transmitter IQ mismatch parameter represents the phase or gain mismatch between the signal components on the I-path and the Q-path in the transmitter analog module 222. In one embodiment, the transmitter IQ mismatch parameter represents the phase mismatch of signals on the Q-path and the I-path, and the loop-back module 24 determines the transmitter IQ mismatch parameter according to the I-path phase mismatch parameter $\theta_I$ and the Q-path phase mismatch parameter $\theta_Q$. The loop-back module 24 can determine the transmitter IQ mismatch parameter θ by a difference of the I-path phase mismatch parameter $\theta_I$ and the Q-path phase mismatch parameter $\theta_Q$, i.e., $\theta=\theta_I-\theta_Q$. In another embodiment, the transmitter IQ mismatch parameter represents the gain mismatch G of signals on the I-path and the Q-path, and the loop-back module 24 determines the transmitter IQ mismatch parameter G according to the I-path gain mismatch parameter ($1+\epsilon_Q$) and the Q-path gain mismatch parameter ($1+\epsilon_Q$), as expressed in Equation (11). When the first non-zero signal I' equals the second non-zero signal Q', the loop-back module 24 determines the transmitter IQ mismatch parameter G only according to the in-phase component and the quadrature component of the down-converted RF signal, as shown in Equation (13).

In step S1008, the transmitter module 22 reduces the transmitter IQ mismatch according to the transmitter IQ mismatch parameter. In one embodiment, the transmitter module 22 reduces the effects of the transmitter IQ mismatch according to the phase compensation matrix $M_\theta$ of the transmitter IQ mismatch parameter, represented by Equation (8). In another embodiment, the transmitter module 22 reduces the effects of the transmitter IQ mismatch according to the gain compensation matrix $M_G$ of the transmitter IQ mismatch parameter, represented by Equation (12). The gain compensation matrix $M_G$ can be realized by the IQ phase mismatch compensation circuit 5 in FIG. 5, and the gain compensation matrix $M_G$ can be implemented by the IQ gain mismatch compensation circuit 6 in FIG. 6.

In step S1010, the IQ mismatch detection and compensation method 10 is completed.

Although the transmitter device 2 is used as an example to explain the operation of the method 10, the transmitter device 4 may also incorporate the method 10 to detect and correct the transmitter IQ mismatch thereof. Persons skilled in the arts may adopt the transmitter IQ mismatch calibration method 10 in a transmitter device without deviating from principle of the invention.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

Information and signals may be represented using any of a variety of different technologies and techniques. For example, data, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A device with IQ mismatch compensation, comprising:
a transmitter oscillator, for providing an oscillator signal;
a transmitter module, for up-converting a transmitter signal with the oscillator signal to generate an RF signal;

a loop-back module, for down-converting the RF signal with the oscillator signal to determine a transmitter IQ mismatch parameter, wherein effects of IQ mismatch of the loop-back module are calibrated by inputting a test signal and the oscillator signal before the down-converting of the RF signal; and wherein the transmitter module is arranged to reduce effects of IQ mismatch of a transmitter path in the transmitter module according to the determined transmitter IQ mismatch parameter.

2. The device of claim 1, wherein the transmitter IQ mismatch parameter indicates a phase mismatch and a gain mismatch of the transmitter path in the transmitter module.

3. The device of claim 1, wherein the transmitter signal comprises an in-phase component and a quadrature component;

the transmitter module is arranged to set the in-phase component of the transmitter signal to a first non-zero signal and the quadrature component of the transmitter signal to a zero signal to generate a first down-converted RF signal, and the loop-back module is arranged to determine the I-path mismatch parameter according to the first down-converted RF signal;

the transmitter module is arranged to set the in-phase component of the transmitter signal to the zero signal and the quadrature component of the transmitter signal to a second non-zero signal to generate a second down-converted RF signal, and the loop-back module is arranged to determine the Q-path mismatch parameter according to the second down-converted RF signal; and the loop-back module is arranged to determine the transmitter IQ mismatch parameter according to the I-path mismatch parameter and the Q-path mismatch parameter.

4. The device of claim 3, wherein the loop-back module is arranged to determine a phase mismatch of the transmitter IQ mismatch parameter by a difference of the I-path mismatch parameter and the Q-path mismatch parameter.

5. The device of claim 3, wherein the loop-back module is arranged to determine a gain mismatch of the transmitter IQ mismatch parameter by a ratio of the I-path mismatch parameter and the Q-path mismatch parameter.

6. The device of claim 3, wherein the first non-zero signal equals the second non-zero signal.

7. The device of claim 1, wherein the transmitter signal comprises an in-phase component and a quadrature component, and an oscillator frequency of the oscillator signal are divided to generate a first oscillator signal and a second oscillator signal which are supplied to the transmitter module and the loop-back module, respectively, the transmitter module is arranged to set the in-phase and quadrature components of the transmitter signal to zero signals to determine a first oscillator phase difference parameter, to set one of the in-phase component and the quadrature component of the transmitter signal to a non-zero constant signal and set the other one of the in-phase component and the quadrature component of the transmitter signal to a zero signal to determine a second oscillator phase difference parameter, and the loop-back module is arranged to determine an oscillator phase difference parameter according to a difference of the first and second oscillator phase difference parameters, and to reduce an oscillator phase difference between the first and second oscillator signals according to the oscillator phase difference parameter.

8. The device of claim 7, wherein the loop-back module is arranged to reduce the oscillator phase difference prior to the transmitter module reducing the transmitter IQ mismatch of the transmitter path.

9. A device with IQ mismatch compensation, comprising:

a loop-back module, for down-converting an RF signal to determine a transmitter IQ mismatch parameter;

a transmitter module, for up-converting a transmitter signal to generate the RF signal, wherein the loop-back module is arranged to determine a first mismatch parameter of the transmitter IQ mismatch parameter when the transmitter module sets one of an in-phase component and a quadrature component of the transmitter signal to a zero signal, the loop-back module is arranged to determine a second mismatch parameter of the transmitter IQ mismatch parameter when the transmitter module sets the other one of the in-phase component and the quadrature component of the transmitter signal to a zero signal; and the transmitter module is arranged to reduce effects of IQ mismatch of a transmitter path in the transmitter module according to the first and second mismatch parameters of the transmitter IQ mismatch parameter.

10. The device of claim 9, wherein the transmitter signal comprises an in-phase component and a quadrature component;

the transmitter module is arranged to set the in-phase component of the transmitter signal to a first non-zero signal and the quadrature component of the transmitter signal to the zero signal to generate a first down-converted RF signal, and the loop-back module is arranged to determine the I-path mismatch parameter according to the first down-converted RF signal;

the transmitter module is arranged to set the in-phase component of the transmitter signal to the zero signal and the quadrature component of the transmitter signal to a second non-zero signal to generate a second down-converted RF signal, and the loop-back module is arranged to determine the Q-path mismatch parameter according to the second down-converted RF signal; and the loop-back module is arranged to determine the transmitter IQ mismatch parameter according to the I-path mismatch parameter and the Q-path mismatch parameter.

11. The device of claim 10, wherein the transmitter IQ mismatch parameter is a phase mismatch between an I-path and a Q-path of the transmitter module, the loop-back module is arranged to determine the phase mismatch by a difference of the I-path mismatch parameter and the Q-path mismatch parameter, and the transmitter module is arranged to reduce the effects of the IQ mismatch of the transmitter path in the transmitter module according to a phase compensation matrix of the phase mismatch:

$$\begin{bmatrix} 1 & -\tan\theta \\ -\tan\theta & 1 \end{bmatrix}.$$

12. The device of claim 10, wherein the transmitter signal comprises an in-phase component and a quadrature component;

the transmitter module is arranged to set the in-phase component of the transmitter signal to a first non-zero signal and the quadrature component of the transmitter signal to the zero signal to generate the first down-converted RF signal, and the loop-back module is arranged to determine the I-path mismatch parameter according to the first down-converted RF signal and the in-phase component of the transmitter signal;

the transmitter module is arranged to set the in-phase component of the transmitter signal to the zero signal and the quadrature component of the transmitter signal to the second non-zero signal to generate the second down-converted RF signal, and the loop-back module is arranged to determine the Q-path mismatch parameter according to the second down-converted RF signal and the quadrature component of the transmitter signal; and the loop-back module is arranged to determine the transmitter IQ mismatch parameter according to the I-path mismatch parameter and the Q-path mismatch parameter.

13. The device of claim 12, wherein the transmitter IQ mismatch parameter is a gain mismatch between an I-path and a Q-path of the transmitter module, the loop-back module determines the gain mismatch G by a gain equation:

$$G = \frac{(1+\varepsilon_I)}{(1+\varepsilon_Q)} = \frac{\sqrt{(r_{I\_IPATH}^2 + r_{Q\_IPATH}^2)}}{(r_{I\_QPATH}^2 + r_{Q\_QPATH}^2)} \cdot \frac{Q'}{I'}$$

where:

$(1+\varepsilon_I)$ is the I-path mismatch parameter;

$(1+\varepsilon_Q)$ is the Q-path mismatch parameter;

$r_{I\_IPATH}^2$ and $r_{Q\_IPATH}^2$ are the in-phase and quadrature component of the down-converted RF signal respectively when the in-phase component of the transmitter signal is the first non-zero signal I' and the quadrature component of the transmitter signal is a zero signal;

$r_{I\_IPATH}^2$ and $r_{Q\_IPATH}^2$ are the in-phase and quadrature component of the down-converted RF signal respectively when the in-phase component of the transmitter signal is a zero signal and the quadrature component of the transmitter signal is the second non-zero signal Q'; and I' is a first non-zero in-phase component of the transmitter signal, and Q' is the second non-zero quadrature component of the transmitter signal; and the transmitter module comprises a transmitter baseband module, coupled to the loop-back module, reducing the effects of the IQ mismatch of the transmitter path in the transmitter module according to a gain compensation matrix of the transmitter IQ mismatch parameter:

$$\begin{bmatrix} 1 & 0 \\ 0 & \frac{(1+\varepsilon_I)}{(1+\varepsilon_Q)} \end{bmatrix}.$$

14. The device of claim 12, wherein the first non-zero signal equals the second non-zero signal.

15. The device of claim 9, wherein the transmitter signal comprises an in-phase component and a quadrature component, and an oscillator frequency of the oscillator signal are divided to generate a first oscillator signal and a second oscillator signal which are supplied to the transmitter module and the loop-back module, respectively, the transmitter module is arranged to set the in-phase and quadrature components of the transmitter signal to zero signals to determine a first oscillator phase difference parameter, to set one of the in-phase component and the quadrature component of the transmitter signal to a non-zero constant signal and set the other one of the in-phase component and the quadrature component of the transmitter signal to a zero signal to determine a second oscillator phase difference parameter, and the loop-back module is arranged to determine an oscillator phase difference parameter according to a difference of the first and second oscillator phase difference parameters, and to reduce an oscillator phase difference between the first and second oscillator signals according to the oscillator phase difference parameter.

16. The device of claim 15, wherein the loop-back module is arranged to reduce the oscillator phase difference prior to the transmitter module reducing the transmitter IQ mismatch of the transmitter path.

17. An IQ mismatch compensation method, comprising:

up-converting a transmitter signal with an oscillator signal by a transmitter module to generate an RF signal;

down-converting the RF signal with the oscillator signal to determine a transmitter IQ mismatch parameter by a loop-back module, wherein a test signal and the oscillator signal are inputted to calibrate effects of IQ mismatch of the loop-back module before the down-converting of the RF signal; and reducing effects of IQ mismatch of a transmitter path in the transmitter module according to the determined transmitter IQ mismatch parameter.

18. The IQ mismatch compensation method of claim 17, wherein the transmitter IQ mismatch parameter indicates a phase mismatch and a gain mismatch of the transmitter path in the transmitter module.

19. The IQ mismatch compensation method of claim 17, wherein the transmitter signal comprises an in-phase component and a quadrature component; and the IQ mismatch compensation method further comprises:

setting the in-phase component of the transmitter signal to a first non-zero signal and the quadrature component of the transmitter signal to a zero signal to generate a first down-converted RF signal;

determining the I-path mismatch parameter according to the first down-converted RF signal;

setting the in-phase component of the transmitter signal to the zero signal and the quadrature component of the transmitter signal to a second non-zero signal to generate a second down-converted RF signal;

determining the Q-path mismatch parameter according to the second down-converted RF signal; and determining the transmitter IQ mismatch parameter according to the I-path mismatch parameter and the Q-path mismatch parameter.

20. The IQ mismatch compensation method of claim 19, wherein the step of determining the transmitter IQ mismatch parameter comprises determining a phase mismatch of the transmitter IQ mismatch parameter by a difference of the I-path mismatch parameter and the Q-path mismatch parameter.

21. The IQ mismatch compensation method of claim 19, wherein the step of determining the transmitter IQ mismatch parameter comprises determining a gain mismatch of the transmitter IQ mismatch parameter by a ratio of the I-path mismatch parameter and the Q-path mismatch parameter.

22. The IQ mismatch compensation method of claim 19, wherein the first non-zero signal equals the second non-zero signal.

23. The IQ mismatch compensation method of claim 17, wherein the transmitter signal comprises an in-phase component and a quadrature component, and the IQ mismatch compensation method further comprises:

setting the in-phase and quadrature components of the transmitter signal to zero signals to determine a first oscillator phase difference parameter setting one of the in-phase component and the quadrature component of the transmitter signal to a non-zero constant signal and the other one of the in-phase component and the quadrature component of the transmitter signal to a zero signal to determine a second oscillator phase difference parameter;

determining an oscillator phase difference parameter according to a difference of the first and second oscillator phase difference parameters; and the loop-back module reducing an oscillator phase difference between the first and second oscillator signals according to the oscillator phase difference parameter.

24. The IQ mismatch compensation method of claim 23, wherein the step of reducing the oscillator phase difference is performed prior to the step of reducing the transmitter IQ mismatch of the transmitter path.

25. An IQ mismatch compensation method, wherein a transmitter module is arranged to up-convert a transmitter signal to generate an RF signal, the IQ mismatch compensation method comprising:

down-converting the RF signal to determine a transmitter IQ mismatch parameter by setting one of an in-phase component and a quadrature component of the transmitter signal to a zero signal to determine a first mismatch parameter of a transmitter IQ mismatch parameter; and setting the other one of the in-phase component and the quadrature component of the transmitter signal to a zero signal to determine a second mismatch parameter of the transmitter IQ mismatch parameter; and reducing effects of IQ mismatch of a transmitter path in the transmitter module according to the first and second mismatch parameters of the determined transmitter IQ mismatch parameter.

26. The IQ mismatch compensation method of claim 25, wherein the transmitter signal comprises an in-phase component and a quadrature component;

setting the in-phase component of the transmitter signal to a first non-zero signal and the quadrature component of the transmitter signal to the zero signal to generate a first down-converted RF signal;

determining the I-path mismatch parameter according to the first down-converted RF signal;

setting the in-phase component of the transmitter signal to the zero signal and the quadrature component of the transmitter signal to a second non-zero signal to generate a second down-converted RF signal;

determining the Q-path mismatch parameter according to the second down-converted RF signal; and determining the transmitter IQ mismatch parameter according to the I-path mismatch parameter and the Q-path mismatch parameter.

27. The IQ mismatch compensation method of claim 26, wherein the transmitter IQ mismatch parameter is a phase mismatch between an I-path and a Q-path of the transmitter module;

determining the phase mismatch by a difference of the I-path mismatch parameter and the Q-path mismatch parameter; and reducing the effects of the IQ mismatch of the transmitter path in the transmitter module according to a phase compensation matrix of the phase mismatch:

$$\begin{bmatrix} 1 & -\tan\theta \\ -\tan\theta & 1 \end{bmatrix}.$$

28. The IQ mismatch compensation method of claim 26, wherein the transmitter signal comprises an in-phase component and a quadrature component;

setting the in-phase component of the transmitter signal to a first non-zero signal and the quadrature component of the transmitter signal to the zero signal to generate the first down-converted RF signal;

determining the I-path mismatch parameter according to the first down-converted RF signal and the in-phase component of the transmitter signal;

setting the in-phase component of the transmitter signal to the zero signal and the quadrature component of the transmitter signal to the second non-zero signal to generate the second down-converted RF signal;

determining the Q-path mismatch parameter according to the second down-converted RF signal and the quadrature component of the transmitter signal; and determining the transmitter IQ mismatch parameter according to the I-path mismatch parameter and the Q-path mismatch parameter.

29. The IQ mismatch compensation method of claim 28, wherein the transmitter IQ mismatch parameter is a gain mismatch between an I-path and a Q-path of the transmitter module;

determining the gain mismatch G by a gain equation:

$$G = \frac{(1+\varepsilon_I)}{(1+\varepsilon_Q)} = \frac{\sqrt{(r_{I\_IPATH}^2 + r_{Q\_IPATH}^2)}}{(r_{I\_QPATH}^2 + r_{Q\_QPATH}^2)} \cdot \frac{Q'}{I'}$$

where:

$(1+\epsilon_I)$ is the I-path mismatch parameter;

$(1+\epsilon_Q)$ is the Q-path mismatch parameter;

$r_{I\_IPATH}^2$ and $r_{Q\_IPATH}^2$ are the in-phase and quadrature component of the down-converted RF signal respectively when the in-phase component of the transmitter signal is the first non-zero signal I' and the quadrature component of the transmitter signal is a zero signal;

$r_{I\_IPATH}^2$ and $r_{Q\_IPATH}^2$ are the in-phase and quadrature component of the down-converted RF signal respectively when the in-phase component of the transmitter signal is a zero signal and the quadrature component of the transmitter signal is the second non-zero signal Q'; and I' is a first non-zero in-phase component of the transmitter signal, and Q' is the second non-zero quadrature component of the transmitter signal; and the transmitter module comprises a transmitter baseband module, coupled to the loop-back module, reducing the effects of the IQ mismatch of the transmitter path in the transmitter module according to a gain compensation matrix of the transmitter IQ mismatch parameter:

$$\begin{bmatrix} 1 & 0 \\ 0 & \dfrac{(1+\varepsilon_I)}{(1+\varepsilon_Q)} \end{bmatrix}.$$

30. The IQ mismatch compensation method of claim 28, wherein the first non-zero signal equals the second non-zero signal.

31. The IQ mismatch compensation method of claim 25, wherein the transmitter signal comprises an in-phase component and a quadrature component; the IQ mismatch compensation method further comprises:
- setting the in-phase and quadrature components of the transmitter signal to zero signals to determine a first oscillator phase difference parameter;
- setting one of the in-phase component and the quadrature component of the transmitter signal to a non-zero constant signal and setting the other one of the in-phase component and the quadrature component of the transmitter signal to a zero signal to determine a second oscillator phase difference parameter;
- determining an oscillator phase difference parameter according to a difference of the first and second oscillator phase difference parameters; and
- reducing an oscillator phase difference between the first and second oscillator signals according to the oscillator phase difference parameter.

32. The IQ mismatch compensation method of claim 31, wherein the step of reducing the oscillator phase difference is performed prior to the step of reducing the transmitter IQ mismatch of the transmitter path.

* * * * *

UNITED STATES PATENT AND TRADEMARK OFFICE
CERTIFICATE OF CORRECTION

PATENT NO.        : 8,861,644 B2                                    Page 1 of 2
APPLICATION NO.   : 13/168226
DATED             : October 14, 2014
INVENTOR(S)       : Chen et al.

It is certified that error appears in the above-identified patent and that said Letters Patent is hereby corrected as shown below:

In the Specification

In col. 3, line 64, after "device" please insert --2--;
In col. 4, line 11, please delete "24" and insert in its place --22--;
In col. 4, lines 29-30, please delete "oscillator phase difference detection and compensation module" and insert in its place --oscillator mismatch detection and compensation module--;
In col. 4, line 32, please delete "and" and insert in its place --,--;
In col. 4, line 32, after "24202," please insert --and 24204,--;
In col. 4, line 32, please delete "22204" and insert in its place --24206--;
In col. 4, line 32, please delete "22206" and insert in its place --24208--;
In col. 4, line 32, please delete "buffers 24208,";
In col. 4, line 33, please delete "24212" and insert in its place --24210--;
In col. 4, line 33, please delete "24216" and insert in its place --24212--;
In col. 4, line 34, please delete "24216" and insert in its place --24214--;
In col. 4, line 35, please delete "24218" and insert in its place --(not shown)--;
In col. 4, line 35, after "amplifier" please delete "24218";
In col. 4, line 37, please delete "24204" and insert in its place --24206--;
In col. 4, line 37, please delete "the buffer 24208,";
In col. 4, line 38, please delete "24212" and insert in its place --24210--;
In col. 4, line 39, please delete "24206" and insert in its place --24208--;
In col. 4, line 39, please delete "the buffer 24210,";
In col. 4, line 39, please delete "then to";
In col. 4, line 39, please delete "24214" and insert in its place --24212--;
In col. 4, line 40, please delete "24216" and insert in its place --24214--;
In col. 4, line 54, please delete "24204" and insert in its place --24206--;
In col. 4, line 54, please delete "24208" and insert in its place --24210--;
In col. 4, line 55, please delete "the" and insert in its place --an--;
In col. 4, line 56, please delete "r(t)" and insert in its place --y(t)--,
In col. 4, line 57, after "signal" please insert -- r(t), represented by $r_I(t)$--;

Signed and Sealed this
First Day of September, 2015

Michelle K. Lee
*Director of the United States Patent and Trademark Office*

CERTIFICATE OF CORRECTION (continued)
U.S. Pat. No. 8,861,644 B2

In col. 4, line 57, please delete "mixer" and insert in its place --mixers--;
In col. 4, line 57, after "24202, " please insert --24204,--;
In col. 4, line 58, please delete "24206" and insert in its place --24208--;
In col. 4, line 58, please delete "24210" and insert in its place --24212--;
In col. 4, line 61, after "signal" please insert -- r(t), represented by $r_Q(t)$--;
In col. 4, line 63, after "signal" please delete "x(t)";
In col. 5, line 1, after "24" please insert --via the oscillator buffer 26--;
In col. 5, lines 19-20, please delete "before being transmitted by" and insert in its place --to generate an outgoing RF signal y(t) to be transmitted via--;
In col. 10, lines 55-56, please delete "oscillator phase difference detection and compensation module" and insert in its place --oscillator mismatch detection and compensation module--;
In col. 11, lines 1-2, please delete "oscillator phase difference detection and compensation module" and insert in its place --oscillator mismatch detection and compensation module--;
In col. 11, lines 8-9, please delete "oscillator phase difference detection and compensation module" and insert in its place --oscillator mismatch detection and compensation module--;
In col. 11, line 14, please delete "$(-\theta_I-\phi)$" and insert in its place --$(-\theta_I'-\phi)$--;
In col. 11, lines 14-15, please delete "oscillator phase difference detection and compensation module" and insert in its place --oscillator mismatch detection and compensation module--;
In col. 11, line 16, please delete "$(-\theta_I-\phi)$" and insert in its place --$(-\theta_I'-\phi)$--;
In col. 11, line 20, please delete "$(-\theta_I-\phi)$" and insert in its place --$(-\theta_I'-\phi)$--;
In col. 11, lines 21-22, please delete "oscillator phase difference detection and compensation module" and insert in its place --oscillator mismatch detection and compensation module--;
In col. 11, line 24, please delete "$(-\theta_I-\phi)$" and insert in its place --$(-\theta_I'-\phi)$--;
In col. 11, line 27, please delete "$-\theta_I$" and insert in its place ---$\theta_I'$--;
In col. 11, lines 31-32, please delete "oscillator phase difference detection and compensation module" and insert in its place --oscillator mismatch detection and compensation module--;
In col. 11, line 35, please delete "$(-\theta_I-\phi)$" and insert in its place --$(-\theta_I'-\phi)$--;
In col. 12, lines 45-46, please delete "oscillator phase difference detection and compensation module" and insert in its place --oscillator mismatch detection and compensation module--;
In col. 12, lines 47-48, please delete "oscillator phase difference detection and compensation module" and insert in its place --oscillator mismatch detection and compensation module--;
In col. 12, line 51, please delete "$(-\theta_I-\phi)$" and insert in its place --$(-\theta_I'-\phi)$--;
In col. 12, line 54, please delete "$(-\theta_I-\phi)$" and insert in its place --$(-\theta_I'-\phi)$--;
In col. 13, line 14, please delete "$(-\theta_I-\phi)$" and insert in its place --$(-\theta_I'-\phi)$--;
In col. 13, line 28, please delete "$(-\theta_I-\phi)$" and insert in its place --$(-\theta_I'-\phi)$--;
In col. 13, line 30, please delete "$(-\theta_I-\phi)$" and insert in its place --$(-\theta_I'-\phi)$--;
In col. 13, line 34, please delete "$(-\theta_I)$" and insert in its place --$(-\theta_I')$--;
In col. 13, line 35, please delete "$(-\theta_I)$" and insert in its place --$(-\theta_I')$--;
In col. 14, line 27, please delete "$(-\theta_I-\phi)$" and insert in its place --$(-\theta_I'-\phi)$--;
In col. 14, line 33, please delete "$(-\theta_I-\phi)$" and insert in its place --$(-\theta_I'-\phi)$--;
In col. 14, line 36, please delete "$(-\theta_I-\phi)$" and insert in its place --$(-\theta_I'-\phi)$--;
In col. 14, line 37, please delete "$(-\theta_I)$" and insert in its place --$(-\theta_I')$--;
In col. 14, line 39, please delete "$(-\theta_I)$" and insert in its place --$(-\theta_I')$--.